Dec. 28, 1965  P. S. HEILER  3,225,376
CONCEALED WINDSHIELD WIPER MECHANISM
Filed May 4, 1964  3 Sheets-Sheet 1

INVENTOR.
PAUL S. HEILER
BY
*W. E. Finkn*
HIS ATTORNEY

Dec. 28, 1965 P. S. HEILER 3,225,376
CONCEALED WINDSHIELD WIPER MECHANISM
Filed May 4, 1964 3 Sheets-Sheet 2

INVENTOR.
PAUL S. HEILER
BY W. E. Finke
HIS ATTORNEY

Dec. 28, 1965  P. S. HEILER  3,225,376
CONCEALED WINDSHIELD WIPER MECHANISM
Filed May 4, 1964  3 Sheets-Sheet 3

INVENTOR.
PAUL S. HEILER
BY
*W. E. Finke*
HIS ATTORNEY

United States Patent Office 3,225,376
Patented Dec. 28, 1965

3,225,376
CONCEALED WINDSHIELD WIPER MECHANISM
Paul S. Heiler, Fairport, N.Y., assignor to General Motors Corporation, Detroit, Mich., a corporation of Delaware
Filed May 4, 1964, Ser. No. 364,456
13 Claims. (Cl. 15—250.19)

This invention pertains to windshield cleaning mechanism, and particularly to an improved wiper mechanism for vehicular windshields which is concealed when not in use.

Heretofore, it has been proposed to conceal the wiper arm and blade assembly in a well located forwardly of the windshield when the windshield cleaning mechanism is not in use, and to close the well by means of a cover which is pivotally attached to the vehicle. In these prior proposals the cover has either been manually operated between its open and closed positions or a separate cover actuating motor has been provided. The present invention relates to a simplified concealed windshield cleaning mechanism wherein the cover means for the well are automatically actuated by the wiper drive linkage during movement of the wiper blade and arm assemblies between their operating positions, whereat they engage the windshield, and their stowed positions, whereat they are disposed within the well.

Accordingly, among my objects are the provision of concealed windshield wiper mechanism for automatically operating cover means during movement of the wiper mechanism between its stowed and operating positions; the further provision of concealed windshield wiper mechanism including linkage means actuated by the wiper drive mechanism for automatically coordinating movement of the cover means between open and closed positions with movement of the wiper mechanism between its parked and operating positions; and the still further provision of concealed windshield wiper mechanism of the aforesaid type including two-part cover means which are spring biased to the open position and wherein the actuating mechanism for the cover means is disengaged from the wiper drive during movement of the wiper arm and blade assemblies throughout their running strokes.

The aforementioned and other objects are accomplished in the present invention by establishing a driving connection between the wiper drive mechanism and the cover actuating linkage during movement of the wiper blade and arm assemblies between their stowed and operating positions. In the specific embodiment disclosed herein, the wiper arm and blade assemblies are operated through a linkage drive from a rotary crank assembly. Each cover part includes a movement amplifying actuating linkage which is drivingly connected with a wiper drive link during movement of the wiper blades and arms between their operating and stowed positions so as to close each cover part when the wiper blade and arm assemblies are moved into the well, and to partially open the cover parts and permit complete spring opening of the cover parts when the wiper blade and arm assemblies are moved from the well onto the windshield.

Further objects and advantages of the present invention will be apparent from the following description, reference being had to the accompanying drawings, wherein a preferred embodiment of the present invention is clearly shown, and wherein similar numerals depict similar parts throughout the several views.

Figure 1:
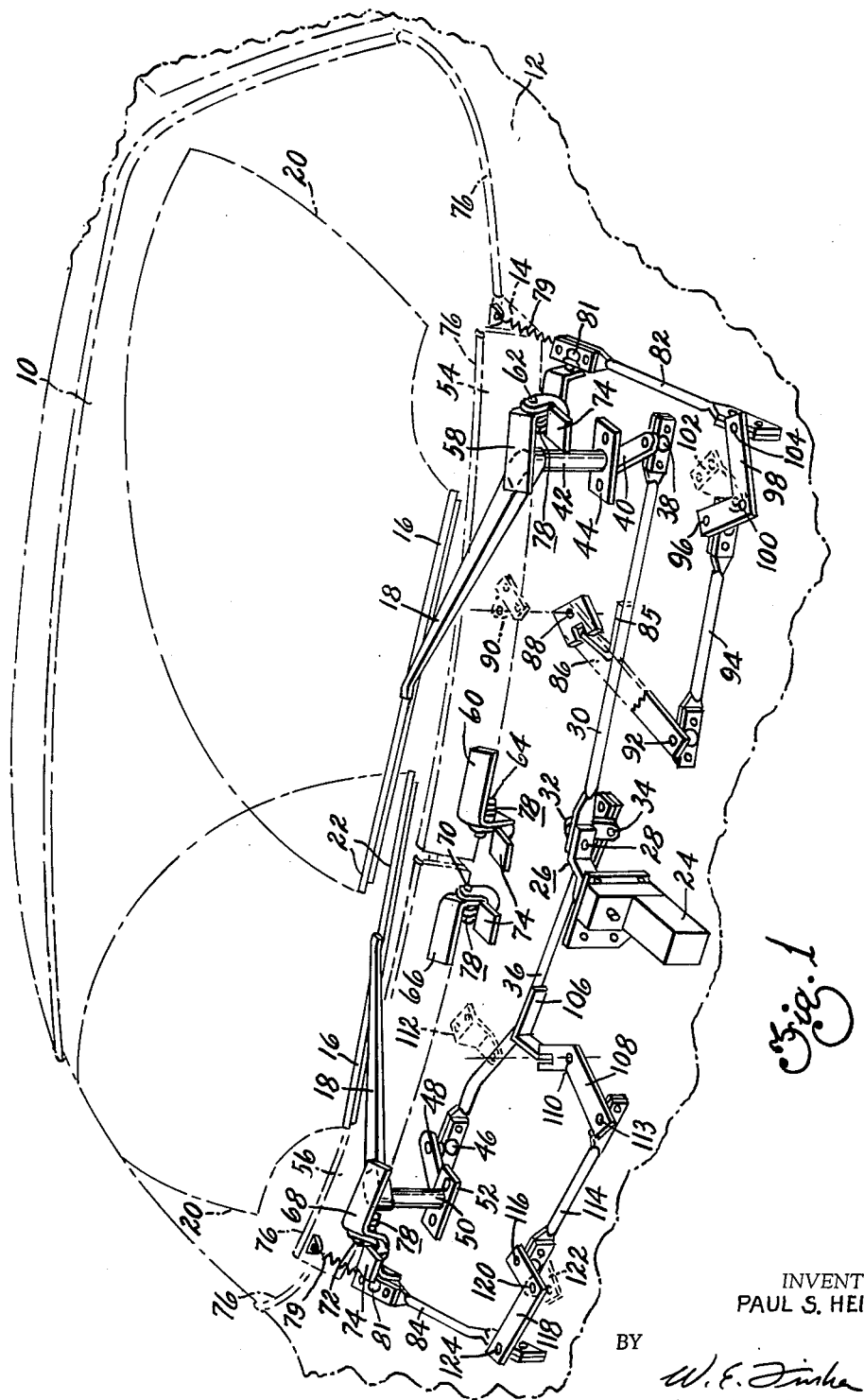
FIGURE 1 is a perspective view of the improved windshield cleaning mechanism with portions of the vehicle being shown in phantom.

Referring to FIGURE 1, a portion of a vehicle is shown having a rearwardly inclined windshield 10 with substantial curvature in horizontal section. The vehicle includes a forwardly extending cowl structure 12 having a transversely extending well 14 therein. The windshield cleaning mechanism comprises a pair of wiper blades 16 carried by wiper arms 18, the wiper arms having spring hinge connected inner and outer sections such that the blades 16 are maintained in engagement with the windshield 10 under pressure so as to conform to the varying curvature thereof. The wiper blades 16 are movable throughout running strokes across the outer surface of the windshield 10 between outboard stroke end limits 20 and inboard stroke end limits 22, and as seen in FIGURE 1, the paths of the two wiper blades overlap in the central portion of the windshield. In addition, the wiper blade and arm assemblies are movable from their inboard stroke end positions 22 to a stowed position within the well 14 when not in use, as will be pointed out more particularly hereinafter.

The wiper blade and arm assemblies are oscillated conjointly in phase opposition by a wiper motor 24 suitably attached to the vehicle. Preferably, the wiper motor 24 comprises an electric motor coupled through a gear reduction unit to a variable throw rotary crank assembly 26 which may be of the type disclosed in Contant et al. Patent 2,985,024. The rotary crank assembly 26 carries a crank pin 28 to which one end of a drive link 30 is pivotally connected. A crank plate 32 is also pivotally connected to the crank pin 28 and carries a second crank pin 34 in the form of a ball stud to which the inner end of a second drive link 36 is connected. The drive link 30 is connected through a ball and socket joint 38 to a crank arm 40 attached to a pivot shaft 42 supported by a bracket 44. Similarly, the drive link 36 is connected through a ball and socket joint 46 to a crank arm 48 attached to a pivot shaft 50 supported by a bracket 52. The mounting, or inner, sections of the wiper arms 18 are drivingly connected to the spaced pivot shafts 42 and 50 which are conjointly oscillated in phase opposition during operation of the motor 24.

The access opening to the cowl well 14 is adapted to be closed by two-part cover means comprising a cover part 54 and a cover part 56. The cover part 54 is connected to a pair of spaced brackets 58 and 60 supported by hinge pins 62 and 64, respectively. Similarly, the cover part 56 is attached to spaced brackets 66 and 68 supported by hinge pins 70 and 72, respectively. Each of the hinge pins is supported by a U-shaped bracket 74 suitably attached to the vehicle. Thus, it can be seen that the cover parts 54 and 56 are hinged for movement about their forward edges to open and close the cowl well 14. The two covers 54 and 56 carry portions of a lower reveal molding 76 for the windshield 10.

Figure 2:
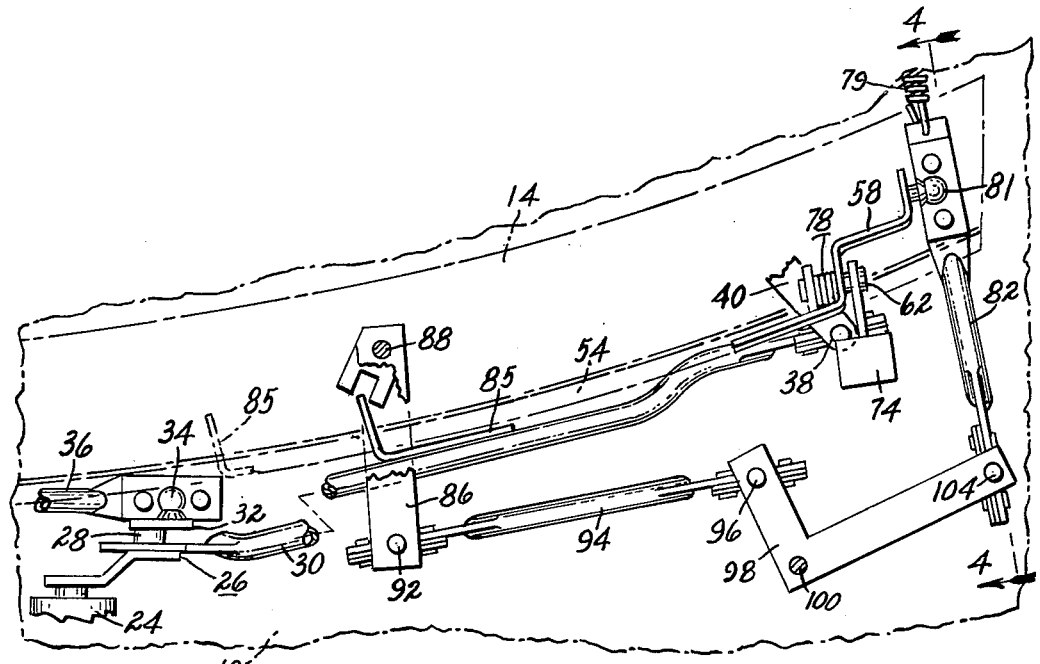
FIGURE 2 is a fragmentary view in elevation of a portion of the wiper and cover actuating mechanism with portions of the vehicle shown in phantom and the cover means in the open position.
Figure 4:
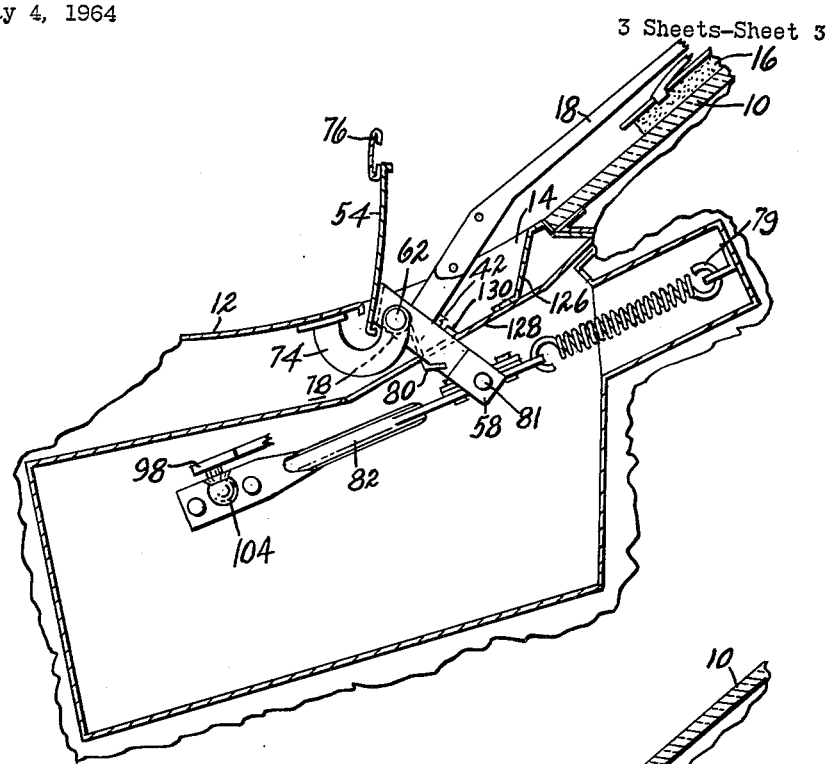
FIGURE 4 is a fragmentary view, partly in section and partly in elevation, taken along line 4—4 of FIGURE 2.
Figure 5:
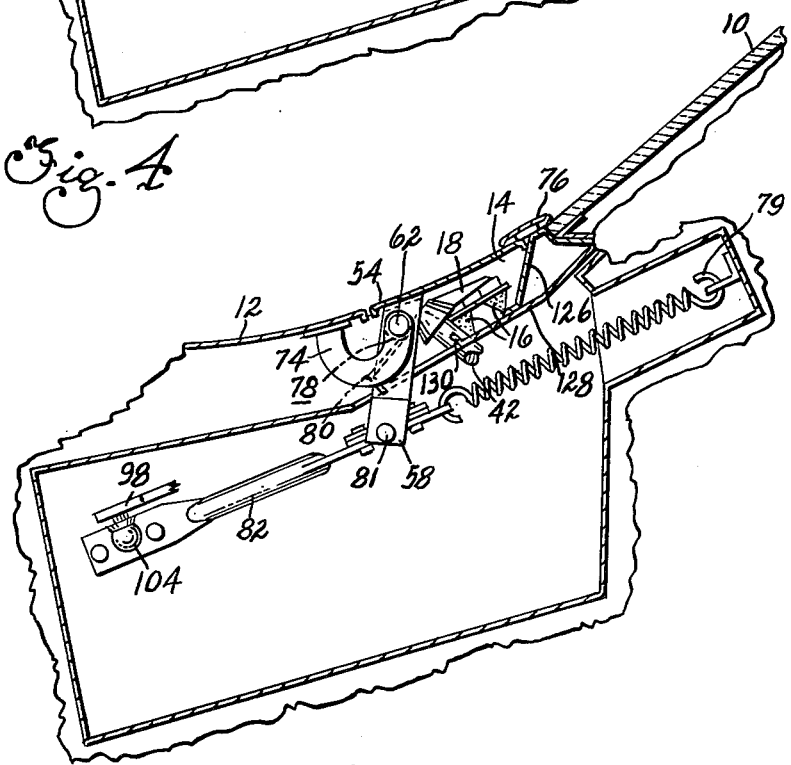
FIGURE 5 is a fragmentary view, partly in section and partly in elevation, taken along line 5—5 of FIGURE 3.

As seen particularly in FIGURES 2 and 4, each of the hinge pins for the two cover parts 54 and 56 is encircled by a torsion spring 78 having one end 80 reacting against its respective cover supporting bracket, and the other end reacting against its respective hinge supporting bracket. The cover supporting brackets 58 and 68 are formed with a plurality of angularly offset portions lying in planes at substantially right angles to each other as shown in FIGURE 2, and carry ball studs 81. The ball studs of the cover brackets 58 and 68 are connected respectively with the ends of reciprocating links 82 and 84, respectively. In addition as seen in FIGURES 1, 4 and 5 each cover part is spring urged to the open position by a coiled extension spring 79. The springs 79 are connected between fixed brackets and each of links 82 and 84.

Referring again to FIGURE 1, drive link 30 has an L-shaped bracket 85 attached thereto between its ends. The bracket 85 coacts with a notched bell crank 86 pivotally supported on a pin 88 carried by a bracket 90 suitably attached to the vehicle. The notched bell crank 86 carries a ball stud 92 at its opposite end which is connected to one end of a link 94, the other end of which is connected through a ball and socket joint 96 to a bell crank 98 having an intermediate pivot 100 supported by a bracket 102. The other end of the bell crank 98 is connected through a ball and socket 104 to the link 82.

The actuating mechanism for the link 84 and the cover part 56 is a substantial duplicate of that described in connection with cover part 54. Thus, the drive link 36 has an L-shaped bracket 106 attached thereto between its ends engageable with a notched bell crank 108 having an intermediate pivot 110 carried by a stationary bracket 112. The other end of the bell crank 108 is connected through a ball and socket joint 113 to one end of a link 114, the other end of which is connected to a ball and socket joint 116 to one end of a bell crank 118. The bell crank 118 is pivotally supported in a pin 210 carried by a bracket 122, and the other end of the bell crank 118 has a ball and socket joint connection 124 with the link 84.

Referring to FIGURES 1 and 2, the notched bell cranks 86 and 108 are disengaged from their respective linkage brackets 85 and 106 during movement of the wiper blade and arm assemblies throughout their running strokes as depicted in FIGURE 1. During movement of the wiper blade and arm assemblies between their outboard stroke limits 20 and their inboard stroke end limits 22, the bracket 85 and the link 30 is moved between the dotted and full line positions shown in FIGURE 2. Thus, the cover actuating linkage is held in the open position as depicted in FIGURE 1, 2 and 4 when the wiper blades are in their operating positions on the windshield by the extension springs 79. The torsion springs 78 function to provide relief to the cover parts if the blades and arms remain on the glass due to an obstruction such as snow or ice.

Figure 3:
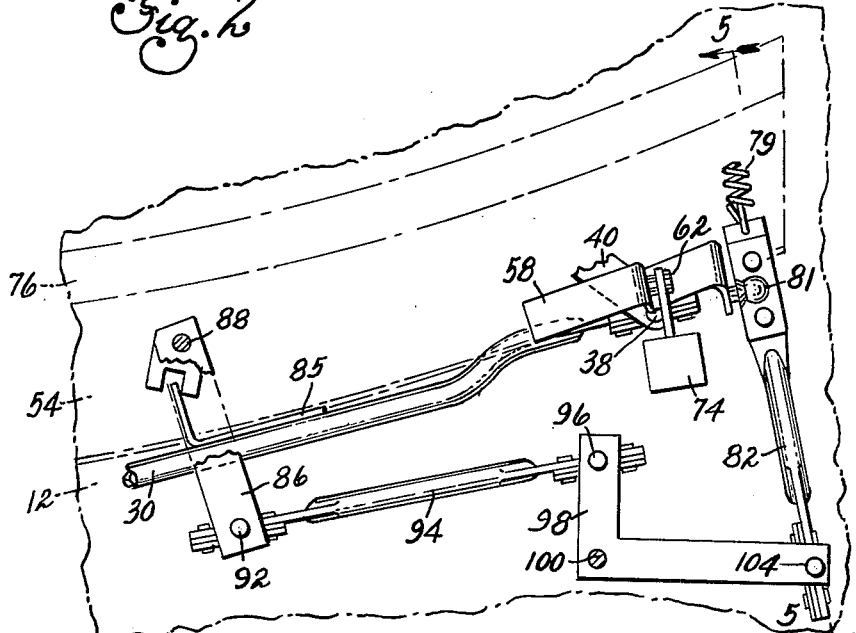
FIGURE 3 is a fragmentary view similar to FIGURE 2 with the cover in the closed position.

However, upon movement of the wiper blade and arm assemblies to their depressed parked positions, or from their operating positions in engagement with the windshield at their stowed positions within the well 14, the brackets 85 and 106 drivingly engage their respective notched bell cranks 86 and 108 and become interlocked therewith as shown in FIGURE 3. As alluded to hereinbefore, parking of the windshield wiper blade and arm assemblies is achieved by increasing the trow of the crank assembly 26 so as to move the wiper blades from their inboard stroke end positions 22 out of contact with the windshield 10 down a ramp 126 constituting the front wall of the well 14 and into engagement with the bottom 128 of the well as shown in FIGURE 5. During this parking movement, the bell crank 86 is acuated from the position shown in FIGURE 2 to the position shown in FIGURE 3, and the bell crank 108 is actuated in a complementary manner. Each cover actuating linkage amplifies the movement imparted to its bell crank by virtue of the fact that the long arm of each notched bell crank is substantially twice the length of the short arm of its respective second bell crank 98 or 118, respectively. Accordingly, the angular movement imparted to the bell crank 98 through the link 94 from the bell crank 86 will be substantially twice the angular movement imparted to the bell crank 86 from the link 30 and the bracket 85. Similarly, since the long arms of the bell cranks 98 and 118 and the crank arm portions of the cover brackets 58 and 68 bear a two to one ratio, the angular movement of each cover part will be substantially twice the angular movement of the intermediate bell cranks. Thus, with a 15° movement of the notched bell cranks 86 and 108 by the transmission links 30 and 36, the cover parts 54 and 56 will move throughout an angle of substantially 60°.

Operation of the improved concealed windshield cleaning mechanism with the wiper blade and arm assemblies within the cowl well 14 and the cover parts 54 and 56 closed is as follows. When the motor 24 is energized, the crank assembly 26 actuates the drive links 30 and 36 to move the wiper blade and arm assemblies from their stowed positions within the well 14 to their operating positions on the windshield 10. During this movement the links 30 and 36 release the notched bell cranks 86 and 108 thus partially opening the cover parts and permit the extension springs 79 to move the cover parts 54 and 56 to the open position. In the fully open position of the cover parts 54 and 56, the crank arm portions of the brackets 58 and 68 engage abutments 130 formed on the lower wall 128 of the well. Continued rotation of the crank assembly, which now has its running crank throw, will result in movement of the wiper blades 16 between their inboard and outboard stroke end limits across the windshield 10. When operation of the cleaning mechanism is no longer required, the manual wiper control is moved to the "off" position, and in so doing the throw of the wiper motor crank assembly 26 is automatically increased so that the wiper blade and arm assemblies will be moved into the well 14 thus causing the drive links 30 and 36 to engage the notched crank arms 86 and 108 respectively to actuate the movement amplifying linkage for each cover part and move the cover parts 54 and 56 to the closed positions as seen in FIGURE 5. Thereafter, the wiper motor is deenergized by an automatic parking switch as more particularly set forth in the aforementioned Patent 2,985,024. Thus, operation of the cover means is automatically coordinated with movement of the cleaner assemblies into and out of the cowl well.

While the embodiment of the invention as herein disclosed constitutes a preferred form, it is to be understood that other forms might be adopted.

What is claimed is as follows:

1. Windshield cleaning mechanism for a vehicle having a windshield, a cowl with a transversely extending well therein having an access opening and a hinged cover for closing the access opening, including, an oscillatable cleaner assembly, drive means operable to impart oscillation to said cleaner assembly across the outer surface of said windshield between predetermined inboard and outboard stroke end limits and to a parked position whereat said cleaner assembly is disposed within said well, and cover operating linkage means automatically actuated by said drive means during movement of said cleaner assembly to and from its parked positon for effecting coordinated movement of said cover between closed and open positions.

2. Windshield cleaning mechanism for a vehicle having a windshield, a cowl with a transversely extending well having an access opening and hinged cover means for closing the access opening, including, a pair of spaced oscillatable cleaner assemblies, drive means operable to impart conjoint oscillation to said cleaner assemblies across the outer surface of said windshield between predetermined inboard and outboard stroke end limits and to parked positions whereat said cleaner assemblies are disposed within said well, and cover operating linkage means automatically actuated by said drive means during movement of said cleaner assemblies to and from their parked positions for effecting coordinated movement of said cover means between closed and open positions.

3. Windshield cleaning mechanism for a vehicle having a windshield, a cowl with a transversely extending well therein having an access opening and a hinged cover for closing the access opening, including, an oscillatable cleaner assembly, a motor, linkage means actuated by said motor for imparting oscillation to said cleaner assembly across the outer surface of said windshield throughout a running stroke and to a parked position whereat said cleaner assembly is disposed within said well, and cover operating means automatically actuated by said linkage means during movement of said cleaner assembly to and from its parked position for effecting coordinated movement of said cover between closed and open positions.

4. Windshield cleaning mechanism for a vehicle having a windshield, a cowl with a transversely extending well therein having an access opening and a hinged cover for closing the access opening, including, an oscillatable cleaner assembly, a motor, a variable throw rotary crank assembly driven by said motor, linkage means connected to said crank assembly for imparting oscillation to said cleaner assembly across the outer surface of said windshield throughout a running stroke, said cleaner assembly being movable to and from a parked position whereat it is disposed within said well upon variation in the throw of said crank assembly, and cover operating means automatically actuated by said linkage means during movement of said cleaner assembly to and from its parked position for effecting coordinated movement of said cover between closed and open positions.

5. In a vehicle, a windshield, a forwardly extending cowl adjacent the lower edge of the windshield, a transversely extending well in said cowl having an access opening, a hinged cover for closing said access opening, a pivot shaft assembly supported in said vehicle and extending into said well, an oscillatable wiper arm and blade assembly drivingly connected to said pivot shaft, a wiper motor mounted in said vehicle, a reciprocable linkage interconnecting said wiper motor and said pivot shaft for imparting oscillation to said wiper arm and blade assembly across the outer surface of said windshield throughout a running stroke and to a parked position whereat said wiper arm and blade assembly is disposed within said well, and cover operating means automatically actuated by said linkage during movement of said wiper blade and arm assembly to and from its parked position for effecting coordinated movement of said cover between closed and open positions.

6. The combination set forth in claim 5 including resilient means biasing said cover towards its open position, and wherein said cover operating means comprises a movement amplifying linkage.

7. The combination set forth in claim 6 wherein said movement amplifying linkage includes a notched bell crank having a fixed intermediate pivot axis, and wherein said linkage includes a bracket engageable with said notched bell crank during movement of said wiper blade and arm assembly between its running stroke and its parked position and disengaged from said notched bell crank during movement of said wiper blade and arm assembly throughout its running stroke.

8. In a vehicle, a windshield, a forwardly extending cowl adjacent the lower edge of the windshield, a transversely extending well in said cowl having an access opening, a two-part hinged cover for closing said access opening, a pair of spaced pivot shaft assemblies attached to said vehicle and extending into said well, a wiper motor mounted between said pivot shaft assemblies, an oscillatable wiper arm and blade assembly drivingly connected to each pivot shaft, a pair of drive links extending in opposite directions from said motor and operatively interconnecting said motor and said pivot shafts for imparting conjoint oscillation to said wiper blade and arm assemblies throughout running strokes across the outer surface of said windshield and to parked positions whereat said wiper arm and blade assemblies are disposed within said well, and operating means for each cover part automatically actuated by its respective drive link during movement of said wiper arm and blade assemblies to and from their parked positions for effecting coordinated movement of said cover parts between closed and open positions.

9. The combination set forth in claim 8 including resilient means for biasing each cover part towards an open position, and wherein the operating means for each cover part comprises a movement amplifying linkage.

10. The combination set forth in claim 9 wherein each drive link has a bracket attached thereto, wherein each cover part movement amplifying linkage includes a notched bell crank, and wherein each drive link includes abutment means engageable with its respective bell crank during movement of said wiper arm and blade assemblies to and from their parked position.

11. Windshield cleaning mechanism for a vehicle having a windshield, a cowl with a transversely extending well therein having an access opening and a hinged cover for closing the access opening, including, an oscillatable cleaner assembly, drive means operable to impart oscillation to said cleaner assembly across the outer surface of said windshield throughout a running stroke and to a parked position whereat said cleaner assembly is disposed within said well, and cover operating linkage means for effecting movement of said cover between closed and open positions, said cover operating linkage means being engageable with said drive means during movement of said cleaner assembly to and from its parked position for effecting coordinated movement of said cover between closed and open positions and being disengaged from said drive means during movement of said cleaner assembly throughout its running stroke.

12. Windshield cleaning mechanism for a vehicle having a windshield, a cowl with a transversely extending well therein having an access opening and a hinged cover for closing the access opening, including, an oscillatable cleaner assembly, a motor, linkage means actuated by said motor for imparting oscillation to said cleaner assembly across the outer surface of said windshield throughout a running stroke and to a parked position whereat said cleaner assembly is disposed within said well, and cover operating means for effecting movement of said cover between closed and open positions, said cover operating means being engageable with said linkage means during movement of said cleaner assembly to and from its parked position for effecting coordinated movement of said cover between closed and open positions and disengaged from said linkage means during movement of said cleaner assembly throughout its running stroke.

13. Windshield cleaning mechanism for a vehicle having a windshield, a cowl with a transversely extending well therein having an access opening and a hinged cover for closing said access opening, including, a motor, a variable throw crank assembly driven by said motor, linkage means connected to said cleaner assembly for imparting oscillation to said cleaner assembly across the outer surface of said windshield throughout a running stroke, said cleaner assembly being movable to and from a parked position whereat it is disposed within said well upon variation in the throw of said crank assembly, and cover operating means for effecting movement of said cover between closed and open positions, said cover operating means being engageable with said linkage means upon variation in the throw of said crank assembly to effect coordinated movement of said cover between closed and open positions during movement of said cleaner assembly to and from its parked position and disengaged from said linkage means during movement of said cleaner assembly throughout its running stroke.

References Cited by the Examiner

UNITED STATES PATENTS

| | | | |
|---|---|---|---|
| 2,895,157 | 7/1960 | Kocourek | 15—250.19 |
| 2,936,477 | 5/1960 | Feller | 15—250.19 |
| 3,120,673 | 2/1964 | Buckwald | 15—250.17 |
| 3,121,092 | 2/1964 | Massoll | 15—250.17 |

FOREIGN PATENTS 721,465   1/1955   Great Britain.

CHARLES A. WILLMUTH, *Primary Examiner.*